(12) United States Patent
Legg

(10) Patent No.: US 9,232,523 B2
(45) Date of Patent: Jan. 5, 2016

(54) ALLOCATING RESOURCES FOR SHARED AND NON-SHARED DOWNLINK WIRELESS RESOURCES

(71) Applicant: Intellectual Ventures Holding 81 LLC, Las Vegas, NV (US)

(72) Inventor: Peter Jonathon Legg, Kista (SE)

(73) Assignee: Intellectual Ventures Holding 81 LLC, Las Vegas, NV (US)

( * ) Notice: Subject to any disclaimer, the term of this patent is extended or adjusted under 35 U.S.C. 154(b) by 0 days.

(21) Appl. No.: 14/297,245

(22) Filed: Jun. 5, 2014

(65) Prior Publication Data

US 2014/0286209 A1  Sep. 25, 2014

Related U.S. Application Data

(63) Continuation of application No. 11/578,090, filed as application No. PCT/EP2005/051549 on Apr. 7, 2007, now Pat. No. 8,983,478.

(30) Foreign Application Priority Data

Apr. 13, 2004  (GB) .................... 0408202.0

(51) Int. Cl.
| | |
|---|---|
| *H04W 72/06* | (2009.01) |
| *H04W 72/04* | (2009.01) |
| *H04B 7/26* | (2006.01) |
| *H04L 5/14* | (2006.01) |
| *H04W 24/00* | (2009.01) |

(52) U.S. Cl.
CPC ......... *H04W 72/0446* (2013.01); *H04B 7/2656* (2013.01); *H04L 5/14* (2013.01); *H04W 72/06* (2013.01); *H04W 24/00* (2013.01)

(58) Field of Classification Search
CPC ...... H04B 7/2656; H04W 24/00; H04W 5/14; H04W 72/06; H04W 72/0446
See application file for complete search history.

(56) References Cited

U.S. PATENT DOCUMENTS

| | | | |
|---|---|---|---|
| 5,418,839 A | 5/1995 | Knuth et al. | |
| 5,448,750 A | 9/1995 | Eriksson et al. | |
| 5,920,547 A | 7/1999 | Werth et al. | |
| 2002/0051462 A1 | 5/2002 | Ertel et al. | |
| 2002/0164989 A1 | 11/2002 | Skillermark et al. | |

(Continued)

FOREIGN PATENT DOCUMENTS

| | | |
|---|---|---|
| EP | 0817521 A2 | 1/1998 |
| EP | 0986928 A1 | 3/2000 |

(Continued)

OTHER PUBLICATIONS

"3rd Generation Partnership Project; Technical Specification Group Radio Access Network; UTRAN Overall Description," (Oct. 1999). 3GPP, 3G TS 25.401 v3.0.0:1-33.

(Continued)

*Primary Examiner* — Ariel Balaoing
(74) *Attorney, Agent, or Firm* — Volpe and Koenig, P.C.

(57) ABSTRACT

Sending information to user equipment (UE) indicating which time slots are not for use by a downlink shared channel is provided. Downlink shared channel resources in shared channel time slots are allocated for UEs. The UEs are subsequently sent downlink shared channel data in the shared channel time slots and sent non-downlink shared channel data to UEs in non-shared channel time slots.

20 Claims, 5 Drawing Sheets

(56) References Cited

U.S. PATENT DOCUMENTS

| | | | |
|---|---|---|---|
| 2003/0003920 A1 | 1/2003 | Sebastian | |
| 2003/0165131 A1* | 9/2003 | Liang et al. | 370/342 |
| 2003/0189915 A1 | 10/2003 | Miller | |
| 2003/0210665 A1* | 11/2003 | Salmenkaita et al. | 370/330 |
| 2004/0062220 A1 | 4/2004 | Bolgiano et al. | |
| 2005/0107107 A1 | 5/2005 | Shahidi et al. | |
| 2006/0126575 A1* | 6/2006 | Pan et al. | 370/335 |
| 2009/0233614 A1 | 9/2009 | Sousa et al. | |

FOREIGN PATENT DOCUMENTS

| | | |
|---|---|---|
| EP | 1063791 A2 | 12/2000 |
| EP | 1087630 A1 | 3/2001 |
| GB | 2296844 A1 | 7/1996 |
| GB | 2355371 A1 | 4/2001 |
| WO | 0205441 A2 | 1/2002 |

OTHER PUBLICATIONS

"3rd Generation Partnership Project; Technical Specification Group Radio Access Network; Radio Resource Management Strategies" (Dec. 1999). 3GPP, 3G TR 25.922 v2.0.0:1-57.

"3rd Generation Partnership Project; Technical Specification Group Services and System Aspects; General Packet Radio Service (GPRS); Service description; Stage 2," Release 1999 (Jun. 2002). 3GPP, 3GPP TS 23.060 v3.12.0:1-192.

Agusti, R. et al. "006 Conceptual Studies on Radio Resource and QoS Management Algorithms," located at <http://www.arrows-ist.upc.es/publications/deliverables/ARROWSD06.pdf> visited on May 2, 2007. (91 pages).

Berg, M. (2002). "Radio Resource Management in Bunched Personal Communication Systems," PhD dissertation submitted to the Royal Institute of Technology, Stockholm, pp. 1-160.

Berg, M. (Sep. 1999). "Maintaining High Capacity for Centralized DCA with Limited Measurements and Signaling," PIMRC 1999, 5 pages.

Dimitriou, N. et al. (Jul. 2000). "Quality of service for multimedia COMA," IEEE Communications Magazine 38(7):88-94.

Forkel, I. et al. (2001). "Dynamic Channel Allocation in UMTS Terrestrial Radio Access TDD Systems," IEEE Proceedinas of the 53rd Vehicular Technoloav Conference 2:1032-1036.

Forkel, I. et al. (2001). "Management of Circuit and Packet Switched Data in UMTS Terrestrial Radio Access Networks," Proceedings 3Gwireless, pp. 267-272.

Great Britain Search Report mailed Oct. 4, 2004, for Great Britain Application No. 0408202 filed Apr. 13, 2004, 3 pages.

Gunnarsson, F. et al. (2002). "Uplink admission control in WCDMA based on relative load estimates," IEEE International Conference on Communications 5:3091-3095.

Haardt, M. et al. (Aug. 2000). "The TD-CDMA Based UTRA TDD Mode," IEEE Journal on Selected Areas in Communication 18(8):1375-1385.

Haas, H. et al. (Oct. 2001). "A Dynamic Channel Assignment Algorithm for a Hybrid TDMNCDMA—TDD Interface Using the Novel TS-Opposing Technique," IEEE Journal on Selected Areas in Communication 19(10):1831-1846.

Holma, H. et al. eds. (2001). WCDMA for UMTS: Radio Access for Third Generation Mobile Communications. John Wiley & Sons Ltd.: West Sussex, England, 10 pages (Table of Contents).

International Search Report mailed Jul. 26, 2005, for PCT Application No. PCT/EP2005/051549 filed Apr.?, 2005, 4 pages.

Kim, I et al. (Jan. 2000). "Sir-Based Call Admission Control by Intercell Interference Prediction for DS-CDMA Systems," IEEE Communications Letters 4(1):29-31.

Lee, J. et al. (2002). "Downlink Admission Control for Multimedia Services in WCDMA" PIMRC 2002, pp. 2234-2238.

Liu, Z. et al. (May 1994). "Sir-based call admission control for DS-CDMA cellular systems," IEEE Journal on Selected Areas in Communication 12(4):638-644.

Non-Final Rejection, U.S. Appl. No. 11/578,090, dated Feb. 15, 2011.

Final Rejection, U.S. Appl. No. 11/578,090, dated Aug. 2, 2011.

Non-Final Rejection, U.S. Appl. No. 11/578,090, dated May 7, 2014.

Notice of Allowance, U.S. Appl. No. 11/578,090, dated Oct. 31, 2014.

* cited by examiner

ALLOCATING RESOURCES FOR SHARED AND NON-SHARED DOWNLINK WIRELESS RESOURCES

CROSS REFERENCE TO RELATED APPLICATIONS

This application is a continuation of U.S. patent application Ser. No. 11/578,090, filed Jun. 6, 2007, which is a U.S. national phase application of International Application No. PCT/EP2005/051549, filed Apr. 7, 2005, which claims priority to United Kingdom Application No. 0408202.0, filed Apr. 13, 2004, which are incorporated by reference as if fully set forth.

FIELD OF INVENTION

This invention relates to communication systems and particularly (though not exclusively) to dynamic channel assignment in cellular communication systems such as 3GPP ($3^{rd}$ Generation Partnership Project) radio communication systems.

BACKGROUND

In UTRA (Universal Mobile Telecommunication System Terrestrial Radio Access) TDD mode within 3GPP, both dedicated and shared channels are supported. Dedicated channels give a reserved resource to a user, in contrast to shared channels in which a pooled resource is dynamically shared amongst users. Dedicated channels are best suited to near constant bandwidth traffic, typically speech or streamed audio/video. Shared channels are more suited to bursty traffic, typically packet data services such as internet traffic.

In UTRA TDD mode, when a dedicated channel (DCH) is admitted, physical resources (channelisation codes and timeslots) are reserved for its exclusive use. This reservation is often called channel allocation. Two forms of channel allocation are employed:

fixed channel allocation (FCA)
dynamic channel allocation (DCA).

In FCA, the codes and timeslots for the DCH are selected at random from those available in the cell.

In DCA, the code and timeslot assignment is intelligent. The following classification of DCA schemes is known, for example from the publication by H. Haas and S. McLaughlin "A dynamic channel assignment algorithm for a Hybrid TDMA/CDMA-TDD interface using a novel TS-opposing technique" in IEEE J. Sel. Areas Comms. 19(10) 2001:

Traffic-adaptive channel allocation: based upon the traffic loading on neighbouring cells, a common pool of channels (codes and timeslots) is shared such that heavily loaded cells receive more channels. Adjusting the downlink-uplink timeslot division in a cell(s) may also be considered here. (note that if the division is not equal in every cell then UE-UE (remote station-remote station) and Node B-Node B (base station-base station) interference sources arise).

Re-use partitioning: this may be employed when an operator has a number of carriers which may be deployed in a re-use pattern.

Interference-based DCA: channels are assigned based upon interference power measurements at the Node B or the UE. These schemes match well to TD-CDMA which is typically interference limited, and they may be deployed in a decentralised architecture giving low algorithmic complexity.

DCA schemes may be either centralised or decentralised. A centralised algorithm would be located at the RNC (Radio Network Controller) and would exploit measurements made at a number of Node B's and UEs in its decision making. The impact of an admission in one cell on the performance of admitted connections in the same and other cells may be determined. Resources from a number of cells may be considered on a collective or pooled basis. Such an algorithm requires significant signalling, may be computationally complex, and may not scale as the number of cells under the RNC is increased.

A decentralised algorithm manages DCH admissions for a single cell (typically). It is located at the RNC, where admission is performed, and where measurements are available. The complexity is considerably reduced, and scaling considerations are easy to estimate (the total complexity for the RNC is proportional to the number of cells under the RNC).

DCA may also be used to reassign the resources of calls in progress to permit the admission of new calls, or to improve their QoS. For example, a voice user may be experiencing high interference in one timeslot, and the DCA algorithm may reassign the user to another timeslot which has lower interference levels.

Call Admission Control

DCA works very closely with Call Admission Control (CAC). Execution of a CAC algorithm is required when UEs are supported with some guarantees of quality of service. Users of 3GPP traffic class="Interactive" only expect to receive better service than other interactive users with lesser traffic handling priority, whilst users of 3GPP traffic class="background" have no expectations (this is truly best effort). However, users of 3GPP traffic class="conversational" or "streaming" have delay and bandwidth requirements. The CAC needs to balance the conflicting requirements of low blocking probability and low dropping probability. Dropping occurs when an ongoing call is prematurely terminated and is perceived by users as more objectionable than blocking (when the system does not allow a call to be initiated in the first place): the blocking probability is thus set higher than the dropping probability. The CAC maintains the loading on the network below a threshold level such that the dropping probability is acceptable.

Network loading may be measured in terms of:
  number of UEs admitted (of each traffic class/quality of service parameters)
  Node B interference (uplink)
  Node B transmit power (downlink)
  Interference is composed of two parts, intracell interference arising from transmissions to/from UEs attached to the same cell, and intercell interference arising from transmissions to/from UEs attached to other cells.
  CAC is needed:
  on new call attempts
  on handovers
  on channel reallocation initiated by DCA.

In the publication "D06: Conceptual studies on Radio Resource and Qos Management Algorithms" (available at web address http://www.arrows-ist.upc.es/publications/deliverables/Summary_Arrows-D06.pdf), a distinction is drawn between DCA and CAC. A first DCA algorithm described in this application maintains an ordered list of timeslots which should be considered when an admission is to be made (this could be a new call, a handover, or a reallocation). The CAC takes a timeslot from the top of this list and evaluates whether the addition of the UE into this timeslot would generate acceptable interference to existing calls. Additionally, a second DCA algorithm can identify calls for reallocation from one timeslot to another—for example, to improve speech quality. However, this publication does not enable dedicated and shared channels to coexist.

Coexistence of Dedicated and Shared Channels

Although the coexistence of dedicated channels (managed by DCA) and shared channels (managed by a radio scheduler) has not been addressed for 3GPP TDD, in the past, to the knowledge of the inventors hereof, clearly there are two possible methods of assigning the codes and timeslots to dedicated and shared channels:

segregation: slots are used exclusively by either dedicated or shared channels mixing: slots support both dedicated and shared channels at the same time.

A discussion of a possible interference based DCA technique is included in 3GPP specification TR 25.922 (available from the website www.3gpp.org). The method is based upon interference measurements made by the UE and the Node B (timeslot Interference Signal Code Power or ISCP, i.e., inter-cell interference). The algorithm is decentralised and located at the RNC. The algorithm covers both slow DCA and fast DCA. Slow DCA involves adjustments to the DL/UL (downlink/uplink) split across cells. The DL/UL split is adjusted for each cell independently of other cells. Fast DCA allocates resources more rapidly. Code pooling and timeslot pooling are discussed (in code pooling a DCH is allocated a number of codes in the same timeslot, whilst in timeslot pooling a single code and multiple timeslots are used). Channel reallocation (intra-cell handover) can be triggered to cope with varying interference conditions, or to reduce fragmentation of codes and timeslots that a DCH uses. UE measurements to support DCA include ISCP, path loss measurements, link quality measurement and UE transmit power values.

In the publication "D06: Conceptual studies on Radio Resource and Qos Management Algorithms" referred to above and in the publication by M. Haardt et al., "The TD-CDMA based UTRA TDD Mode", IEEE J Sel Areas Comms 18(18), August 2000, the DCA algorithm generates a priority list of timeslots according to long and short term recording and statistical evaluation of interference, at the UE and the Node B. This is used by the CAC. The DCA algorithm described reallocates resources to minimise the number of timeslots used. However, these publications do not enable dedicated and shared channels to coexist.

In the publications by Berg, "Maintaining high capacity for centralised DCA with limited measurements and signalling", PIMRC 1999, and "Radio resource management in bunched personal communication systems", PhD Thesis, March 2002, Royal Institute of Technology, Stockholm, a centralised DCA algorithm has been evaluated that exploits knowledge of the gain matrix (the matrix of path gains between UEs and Node B's) and the transmit power of each UE. The method ensures that all SIR targets are met, or the new call is not admitted. The first of these publications suggests ways to compensate for gaps in the gain matrix—by using values taken by other UEs in the same cell, or by setting a higher SIR target for the new admission than necessary and allowing the power control to adjust this during the call. A third method discards the gain matrix approach and instead admits the UE to the timeslot in which it measures the minimum interference. However, such gain matrix calculations are complex.

In the publication by I. Forkel et al., "Dynamic channel allocation in UMTS Terrestrial Radio Access TDD systems", VTC 2001, the admission attempt is made into the DL and UL timeslots with the minimum interference. The admission is allowed if the interference levels in the two directions are below their respective threshold values (these can be service type dependent). A more advanced scheme allows the allocation for a voice call to be changed if the bit error rate (BER) exceeds a threshold for a given duration. The DCA scheme gives C/I gains over FCA but little voice capacity improvement. Furthermore, this publication does not enable dedicated and shared channels to coexist, and the DCA and CAC metrics are crude.

In the publication by I. Forkel & T. Kriengchaiyapruk, "Management of circuit and packet switched data in UMTS terrestrial radio access networks", 3G Wireless 2001, a 'timeslot scoring method' is applied where a timeslot is chosen at random from the set of timeslots whose interference falls below a threshold, and have sufficient capacity. In this technique, code pooling is used, otherwise the DCA and the CAC would be more complex and less reliable. However, this publication does not enable dedicated and shared channels to coexist.

From patent publication EP0817521, "Interference based dynamic channel assignment", it is known to use long and short term interference measurement lists on DL and UL. The algorithms are decentralised, on a per cell or per sector basis.

From patent publication EP0986928, "DCA method in a cellular radio communication network", it is known to maintain priority indices based upon periodic measurements of radio parameters. This publication is orientated to a frequency channel assignment. However, this publication does not enable dedicated and shared channels to coexist and its application to timeslot assignment is not clear.

In patent publication EP1063791, "CDMA communication method using a dynamic channel code assignment, and a base station performing the method", a channelisation code used by a UE is changed in response to interference measurements. However, this publication is restricted to a limited algorithm for an FDD (Frequency Division Duplex) system.

There are known a number of publications involving Call Admission Control for WCDMA, but these are generally oriented towards 3GPP FDD (Frequency Division Duplex) mode. In the publication by H. Holma & A. Toskala (editors), "W-CDMA for UMTS", John Wiley, 2000, an interference based algorithm is described for the FDD mode. On the uplink, the expected interference at the Node B after admission is compared to a threshold. The difficulty is in estimating how much additional interference is generated by the new admission. Two solutions are described, the derivative and integral methods which both exploit knowledge of the shape of the interference versus load curve $I=1/(1-\eta)$ where $\eta$ is the load). On the downlink the expected transmit power following admission is compared to a threshold. The increment in power is estimated by an open loop calculation. The downlink algorithm is applicable to the TDD mode. The uplink algorithm is not applicable to TDD mode since in TDD mode, the Node B detector eliminates most of the intracell interference (thus adding another user to a TDD cell will not increase the detected Node B interference in that cell).

In the publication by J. Lee & Y. Han, "Downlink admission control for multimedia services in WCDMA", IEEE International Symposium on Personal, Indoor and Mobile Radio Communications (PIMRC) 2002, a simple downlink method is described that uses a transmit power threshold value.

There are a number of papers where uplink CAC is based on Node B interference estimation. They differ in the method in which the interference increment is calculated, and also in whether the impact on the serving cell or on neighbouring cells is included too. The publication by Kim et al., "SIR-based call admission control by intercell interference prediction for DS-CDMA systems", IEEE Comms. Letters, 4 (1), 2000, extends the work of Z. Liu and M. E. Zarki in the publication "SIR-based call admission control for DS-CDMA systems", IEEE J. Sel. Areas Comms., 12, 1994 to base an algorithm on 'Residual Capacity', which expresses the number of calls which can be accepted in each cell following the admission of the user in question. The residual capacity is calculated for the intended serving cell and all the neighbours for which the UE is able to make pilot/beacon measurements of. If the residual capacity is greater than or equal to 1 for all cells, then the call is admitted. This method may be useful if the SIR needs of the UEs are the same and sufficient measurements are available to the algorithm. The complexity is moderate. However, this method is limited by the restriction of equal SIR needs and inappropriately includes intracell interference in its workings.

In the publication by N. Dimitrou & R. Tafazolli, "Quality of service for multimedia CDMA", IEEE Comms. Mag. July 2000, there is presented a simple uplink CAC algorithm based on an interference threshold, which can consider the impact on the local cell or on multiple cells. However, this algorithm is relatively inaccurate and unsophisticated.

In the publication by F. Gunnarsson et al., "Uplink admission control in WCDMA based on relative load estimates", International conference on comms. 2002, a formula is derived for the relative (uplink) load on a cell as a function of the SIR target of the service, the path gain between each UE and its serving site, and the path gain between the UE and the cell in question. The CAC algorithm calculates the new relative load in each cell which would follow an admission, and compares these values against a threshold. The relative load in cell j is:

$$\hat{L}_j = \sum_{i=1}^{M} \frac{CTIR_i g_{ij}}{g_{ik}}$$

where
  i is the mobile number, ranging from 1 to M, in the system,
  $CTIR_i$ is the target value of the carrier to total interference ratio for mobile i at its serving site, k,
  $g_{ij}$ is the path gain from mobile i to cell j,
  $g_{ik}$ is the path gain from mobile i to its serving site, cell k.

A call is admitted provided the relative load is less than the threshold for each cell considered. The authors claim that measurements of path gain are more accurate than those of noise or interference at the Node B (as used in the publication by Kim et al., "SIR-based call admission control by intercell interference prediction for DS-CDMA systems", referred to above). If a mobile is too distant to be able to measure the beacon of a cell it is not included in the relative load calculation for that cell. Measurement load is minimised by relying upon initial measurements and thereafter those available at handover. Cell centre UEs offer few measurements (no handovers) but their interference contribution is less than those of cell edge UEs. The approach may be used for multiple services (the CTIR value is changed appropriately). This paper considers FDD where intracell interference cannot be cancelled and is not directly applicable to TDD for the serving cell.

Thus, although many different algorithms are known for channel allocation, these are not optimal for all conditions and systems. In particular, known channel allocation schemes are not ideally suited for communication systems comprising both shared and dedicated communication channels.

Hence, an improved system would be advantageous and in particular a system allowing increased flexibility, improved performance, improved utilisation of shared and dedicated channels and/or improved suitability of a range of communication systems including TDD communication systems would be advantageous.

STATEMENT OF INVENTION

Accordingly, the Invention seeks to preferably mitigate, alleviate or eliminate one or more of the above mentioned disadvantages singly or in any combination.

In accordance with a first aspect of the present invention there is provided a method of allocating a dedicated communication channel in a cellular communication system as claimed in claim 1.

In accordance with a second aspect of the present invention there is provided an apparatus of allocating a dedicated communication channel in a cellular communication system as claimed in claim 19.

In accordance with a third aspect of the present invention there is provided a method for dynamic channel assignment in a TDD radio communication system as claimed in claim 24.

In accordance with a fourth aspect of the present invention there is provided an arrangement for dynamic channel assignment in a TDD radio communication system as claimed in claim 31.

The invention may allow an improved channel allocation in cellular communication systems and may in particular provide for an improved allocation of shared and dedicated communication channels. The invention may additionally or alternatively allow an efficient and low complexity implementation.

By one approach the disclosed concepts will include the step of allocating a channel timeslot for use as a dedicated channel by:

testing each of a plurality of selected shared channel timeslots for code resource acceptability, transmit power acceptability and intercell interference acceptability; and if the testing fails selecting a shared channel timeslot with lowest timeslot number and testing the selected shared channel timeslot for transmit power acceptability and intercell interference acceptability.

It will be appreciated that in some embodiments the present invention is based on interference based DCA, concerns a DCA method that is decentralised for the downlink but centralised in the uplink, includes CAC algorithms, and employs a segregation of dedicated and shared channels.

BRIEF DESCRIPTION OF THE DRAWING(S)

One dynamic channel assignment scheme for TDD radio communication networks with coexisting dedicated and shared channels incorporating the present invention will now be described, by way of example only, with reference to the accompanying drawing(s), in which.

DETAILED DESCRIPTION OF THE PREFERRED EMBODIMENT(S)

The following preferred embodiment of the present invention will be described in the context of a UMTS Radio Access Network (UTRAN) system operating in TDD mode. However, it will be appreciated that the invention is applicable to many other communication systems.

Figure 1:
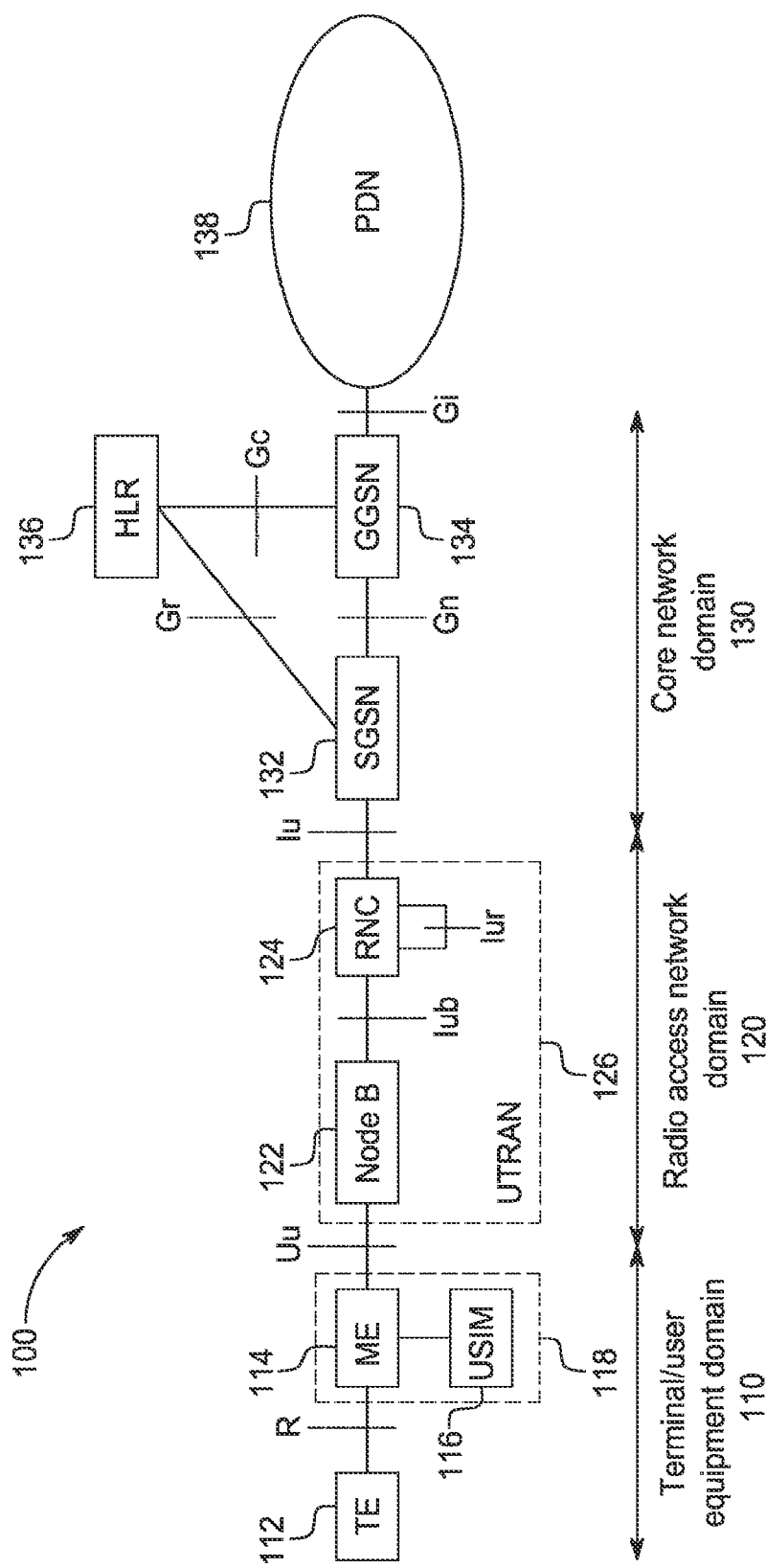
FIG. 1 shows a block schematic diagram illustrating a 3GPP radio communication system in which the present invention may be used.

Referring firstly to FIG. 1, a typical, standard UMTS Radio Access Network (UTRAN) system 100 is conveniently considered as comprising: a terminal/user equipment domain 110; a UMTS Terrestrial Radio Access Network domain 120; and a Core Network domain 130.

In the terminal/user equipment domain 110, terminal equipment (TE) 112 is connected to mobile equipment (ME) 114 via the wired or wireless R interface. The ME 114 is also connected to a user service identity module (USIM) 116; the ME 114 and the USIM 116 together are considered as a user equipment (UE) 118. The UE 118 communicates data with a Node B (base station) 122 in the radio access network domain 120 via the wireless Uu interface. Within the radio access network domain 120, the Node B 122 communicates with an radio network controller (RNC) 124 via the Iub interface. The RNC 124 communicates with other RNC's (not shown) via the Iur interface. The Node B 122 and the RNC 124 together form the UTRAN 126. The RNC 124 communicates with a serving GPRS service node (SGSN) 132 in the core network domain 130 via the Iu interface. Within the core network domain 130, the SGSN 132 communicates with a gateway GPRS support node (GGSN) 134 via the Gn interface; the SGSN 132 and the GGSN 134 communicate with a home location register (HLR) server 136 via the Gr interface and the Gc interface respectively. The GGSN 134 communicates with public data network 138 via the Gi interface.

Thus, the elements RNC 124, SGSN 132 and GGSN 134 are conventionally provided as discrete and separate units (on their own respective software/hardware platforms) divided across the radio access network domain 120 and the core network domain 130, as shown in FIG. 1.

The RNC 124 is the UTRAN element responsible for the control and allocation of resources for numerous Node B's 122; typically 50 to 100 Node B's may be controlled by one RNC. The RNC also provides reliable delivery of user traffic over the air interfaces. RNC's communicate with each other (via the Iur interface) to support handover and macrodiversity.

The SGSN 132 is the UMTS Core Network element responsible for Session Control and interface to the HLR. The SGSN keeps track of the location of an individual UE and performs security functions and access control. The SGSN is a large centralised controller for many RNCs.

The GGSN 134 is the UMTS Core Network element responsible for concentrating and tunnelling user data within the core packet network to the ultimate destination (e.g., internet service provider—ISP).

Such a UTRAN system and its operation are described more fully in the 3GPP technical specification documents 3GPP TS 25.401, 3GPP TS 23.060, and related documents, available from the 3GPP website at www.3gpp.org, and need not be described in more detail herein.

In some embodiments, as described in greater detail below, the present invention is based on realisations of different co-operating DCA and CAC algorithms for a TDD system in which the timeslots are individually used by dedicated or shared channels only (timeslot segregation is applied). In other words there are no timeslots in which dedicated and shared channels exist together. For convenience, the algorithms will be referred to as DCA1, DCA2 and CAC. Besides the algorithms themselves, the described embodiments also include the dynamic management of the timeslot allocation to dedicated and shared channel use, in response to traffic needs. Thus, the described embodiments may allow an improved utilisation of shared and dedicated communication channels thereby providing a more efficient resource utilisation and thus increased capacity of the cellular communication system as a whole.

Figure 2:
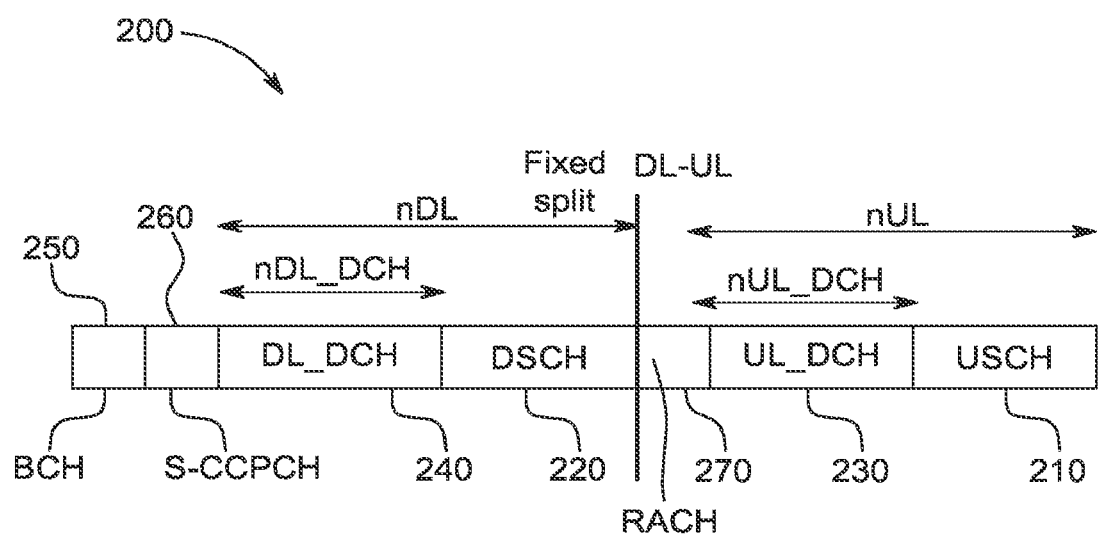
FIG. 2 shows a block schematic diagram illustrating timeslot allocation of the TDD frame in the system of FIG. 1, incorporating the present invention.

The timeslot allocation of the TDD frame 200 is shown in FIG. 2. In this figure, uplink timeslots 210 that are used for shared channels are labelled "USCH", downlink timeslots 220 that are used for shared channels are labelled "DSCH", uplink timeslots 230 that are used for dedicated channels are labelled "UL_DCH", downlink timeslots 240 that are used for dedicated channels are labelled "DL_DCH". The figure also shows 3 types of timeslot that are required to support TDD operation: a "BCH" timeslot 250 is used for broadcast information, a "S-CCPCH" timeslot 260 is used for forward access information and the "RACH" timeslot 270 is used for random access by the UE.

It should be noted that the DL DCH slots 240 need not be continuous, as drawn in the figure, but may be interspersed with DSCH slots 220 (similarly for the uplink).

It should be noted that the division between DL and UL is assumed to be fixed and equal in all cells in the following description, but it will be understood that many aspects of the invention are applicable to a dynamic division between the two directions.

It will further be noted that the particular timeslot usage shown in the figure is exemplary, and that a different arrangement of slots (including the use of multiple divisions between downlink and uplink) are also possible.

The minimum number of DCH slots for each direction is zero, and the maximum number ($n_{DL\_DCH\_MAX}$/$n_{UL\_DCH\_MAX}$) is a function of the number of DL/UL slots ($n_{DL}$/$n_{UL}$) (set by an Operations and Maintenance (OAM) function, the OAM function being a device—typically a computer—that allows an operator to set parameters for network operation) and the admittance of traffic on shared channels with delay guarantees. This can be explained as follows. The shared channels may carry traffic of conversational or streaming traffic class which possess delay guarantees. In order to ensure the meeting of these guarantees, one or more slots should be secured for the shared channels. Of course, this number ($n_{DSCH\_RESERVED}$/$n_{USCH\_RESERVED}$) will fluctuate according to the admitted traffic on shared channels of this nature, it may be zero. Thus:

$$n_{DL\_DCH\_MAX} = n_{DL} - n_{DSCH\_RESERVED}$$

$$n_{UL\_DCH\_MAX} = n_{UL} - n_{USCH\_RESERVED}$$

Furthermore, in the described embodiments, the number of DCH timeslots at any one time, and in a given cell, is controlled by the DCA and CAC algorithms, as described below. Essentially, the algorithm adjusts the number to accommodate the traffic loading on the dedicated channels, but subject to the maximum number ($n_{DL\_DCH\_MAX}$/$n_{UL\_DCH\_MAX}$). The initial number of DL and UL DCH slots should be zero. Thus, the algorithms ensure that, if possible, the number of DCH channels is automatically adjusted in response to the traffic requirement for dedicated channels.

It will appreciated that the embodiments exploit the fact that the multiuser detector-based TDD receiver eliminates intracell interference and that intercell interference is dominant.

The algorithms DCA1, DCA2 and CAC on which the described embodiment of the present invention is based, will now be described in more detail.

DCA1

This algorithm identifies the best candidate timeslot(s) for new admissions (this may be a new call attempt, a handover or a midcall reallocation). The candidate timeslots are held in an ordered list—the CAC algorithm then takes timeslot(s) from the head of this list when a new admission attempt is to be processed. Thus, DCA1 determines a ranking for a plurality of communication channels designated as DCH channels. To maintain the ordered list (in many embodiments a separate list is maintained for the uplink and downlink), measurements are performed by the UE and the Node B, and passed to the algorithm (at the RNC). The measurements may be used to determine interference levels and the ranking may be in response to the interference levels.

DCA1 Downlink

When an admission attempt is to be processed, the UE concerned is instructed to perform ISCP (Interference Signal Code Power, a measure of intercell interference) measurements for the existing (in use) DL DCH timeslots in the prospective serving cell of the UE (there are $n_{DL\_DCH}$ timeslots).

The UE also measures and reports the P-CCPCH (Primary Common Control Physical Channel) RSCP (Received Signal Code Power) for the prospective serving cell (the P-CCPCH RSCP is the received code power for a beacon channel that can be received throughout the cell). The UE sends these measurements to the RNC and the RNC orders the timeslots in terms of increasing ISCP.

DCA1 Uplink

All the Node B's under the RNC are instructed to measure ISCP for all possible uplink DCH timeslots (i.e., over $n_{UL\_DCH\_MAX}$ slots). In the uplink, the ISCP is the uplink intercell interference measured at the Node B.

In one aspect of the described embodiment of the present invention, the metric for uplink DCA1 accounts for the dominance of intercell interference in TDD. This is based on two metrics ("metricA" and "metricB"), which are described below.

The algorithm maintains an ordered list of timeslots in increasing order of the metric, metricA (below), for each cell under the RNC. It will be understood that a subset of these cells could be used if required to ease computational complexity. The list is restricted to the timeslots currently in use by the UL DCHs in that cell, and updated following new measurement reports.

$$metricA_{j,t} = \sum_{n=1, n\neq j}^{N} ISCP_{n,t}$$

where
t is the timeslot,
n is the cell number,
j is the prospective serving cell,
N is the number of cells under the RNC, and
$ISCP_{n,t}$ is the intercell interference at cell n in timeslot t An alternative metric, metricB, is presented below. This metric estimates the maximum value of the ISCP across the set of cells under the RNC for each cell following the admission of UE i.

The expected interference at cell n≠j in timeslot t following the admission of the UE i in cell j is:

$$I_{n,t}=ISCP_{n,t}(1+SIR_{tgt}g_{in}/g_{ij})$$

where
$SIR_{tgt}$ is the SIR (Signal to Interference Ratio) target for UE
$g_{in}$ is the path gain from UE i to cell n≠j, and
$g_{ij}$ is the path gain from UE i to cell j
The metricB determines the maximum value of the expected interference across the cells:

$$metricB_{j,t}=\max_{n\neq j}(I_{n,t})$$

Timeslots are ordered in increasing order of metricB.

DCA2

DCA2 manages DCH resources midcall. It may be used to identify DCHs that should be reallocated from one timeslot to another, for example, to improve the quality of service (QoS) of the radio bearer, or to groom the interference across the slots to improve the likelihood of successful future admissions (and thus maximising the system capacity). DCA2 uses the list of timeslots maintained by DCA1 as candidates for new slot(s) to be used. It then calls CAC to check that this timeslot(s) may be used.

Thus, the DCA2 algorithm may monitor ongoing calls and may determine that it is desirable to switch a call to another communication channel in the form of a different time slot. The highest ranked time slot may then be used and the feasibility of using this time slot is evaluated by the CAC algorithm as described later.

Specific uses of DCA2 are given below:

Midcall Reallocation to Alleviate Outage of a UE

The RNC is able to identify when a UE is about to move into "outage" when its quality of service needs are not met, by the following means:

a) it has hit its maximum (uplink) transmit power. The RNC is able to identify when this occurs by a measurement report that is sent from the UE to the RNC, b) the block error rate is significantly above the target (this is called a radio link failure in 3GPP).

If this occurs, in the prior art, the RNC moves the UE to a different timeslot(s) (the RNC would move the UE to a timeslot where there is less interference, such that the UE may transmit at a lower power to achieve an identical signal to interference ratio). However, in the preferred embodiment of the present invention, when the RNC identifies that the UE is about to move into outage, it spreads the UE transmissions over more timeslots such that the transmit power needed in any individual slot is reduced.

As an example of this aspect, if a speech UE (using a dedicated channel) was admitted when it did not lie at the cell edge, and was granted two units of physical resource in one timeslot on the uplink (as an example in 3GPP TDD, the UE could be granted a single SF8 code and one timeslot), moves to the cell edge it is given an additional timeslot with a single unit of physical resource (as an example, a single SF16 code in the case of 3GPP TDD), and the amount of physical resource in the original timeslot is reduced to a single unit (for example, in the case of 3GPP TDD, the original code is reallocated to SF16). Thereby, by moving the transmission from one to two timeslots the transmit power of the UE in a timeslot is halved, but the data link to the UE is maintained at the original data rate.

End of a Call

In the described embodiment, at the end of a call, if the freeing of the dedicated channels used by that speech call results in a new unused timeslot, that timeslot is released for use by shared channels. Thus, on a determination of a cease of the demand for the DCH, the communication channel, in the form of the time slot, is re-allocated as a shared time slot. This will ensure a dynamic distribution between shared and dedicated channels that will match the current traffic requirements. The described embodiment may further allow a higher prioritisation of dedicated channels than shared channels until the maximum number of dedicated channels is allocated.

CAC

CAC is called when there is a new admission attempt (new call, handover, midcall reallocation). It takes timeslot(s) suggested by DCA1 and tests to see if the new admission in the suggested timeslot would lead to an outage or not. Thus, the CAC algorithm performs a feasibility test for a test time slot to determine if this time slot is suitable for allocation as the required DCH. The test time slot is sequentially selected as the next time slot in the ranked list.

In the specific example, every Node B sends measurement reports to the RNC of the carrier power, $P_{carrier}$, for all possible DL DCH timeslots (there will be $n_{DL\_DCH\_MAX}$ such measurement reports).

On an admission attempt, the uplink and/or downlink admission steps below are taken.

Uplink CAC

Figure 3:
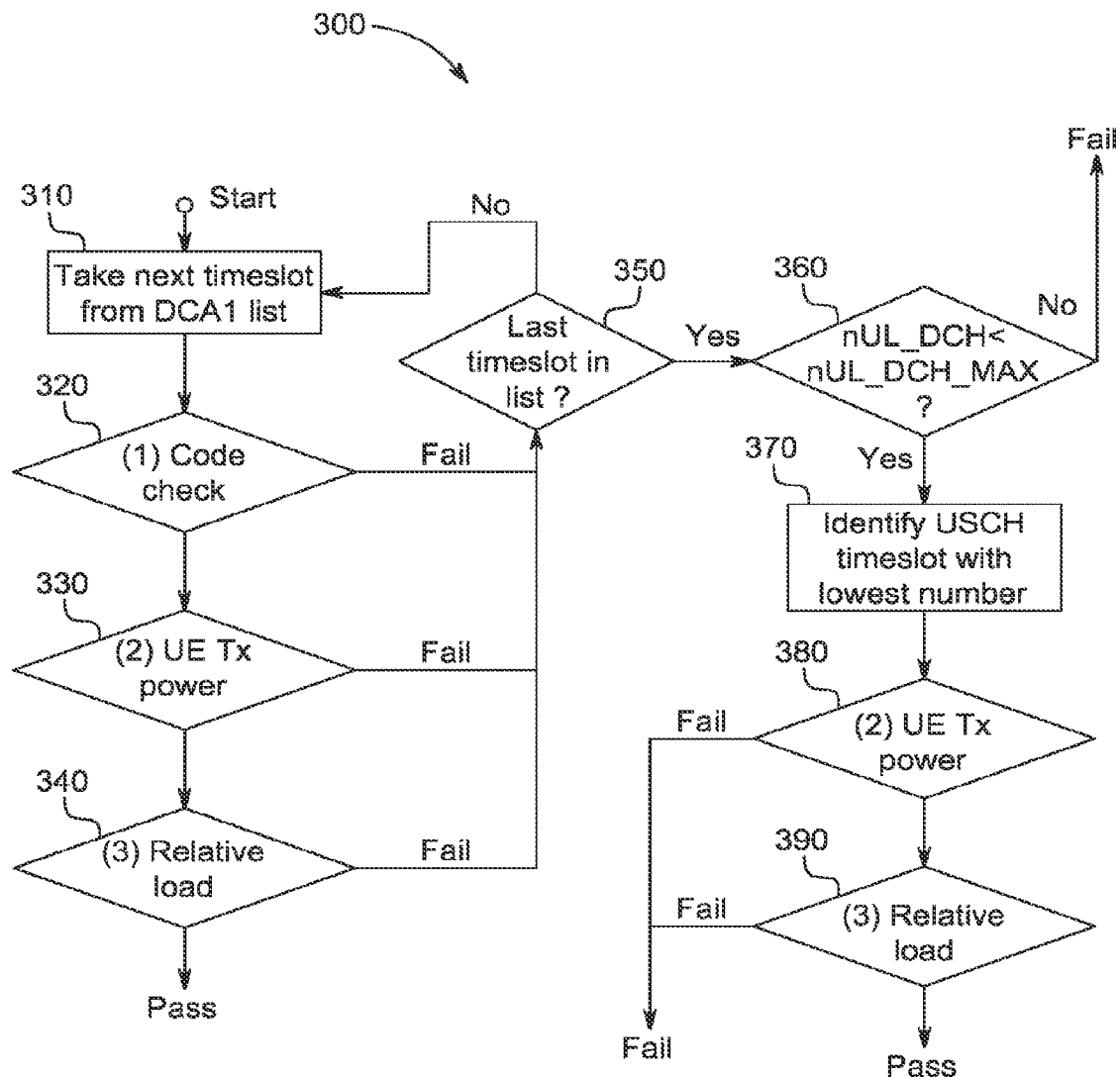
FIG. 3 shows a block schematic diagram illustrating uplink CAC flow in the system of FIG. 1, incorporating the present invention.

In the preferred embodiment of the invention, the flow chart 300 in FIG. 3 shows the sequence of steps for uplink CAC. The flow chart is described in terms of 3GPP terminology where a DCH is a dedicated channel and an USCH is an uplink shared channel.

After start, each timeslot is taken (steps 310 and 350) in turn from the DCA1 list and tests (1) to (3)—steps 320 to 340—(described below) are applied to the timeslots until a timeslot is found for which all tests are passed. Thus, the ranked time slots are sequentially selected as test time slots in the order in which they are ranked. The sequential selection continues until a time slot is found which passes the feasibility test. If no time slots are found that meets the feasibility requirements, a time slot designated as a USCH is re-designated as a DCH. This time slot is then tested and if it meets the feasibility requirement, it is allocated as the required DCH.

Thus, if all timeslots fail, a new timeslot is provisionally acquired for UL DCH if the maximum number of UL DCH slots ($n_{UL\_DCH\_MAX}$) has not been reached (step 360). In an aspect of the preferred embodiment of the invention, in such circumstances, the USCH slot with the smallest available timeslot number is sacrificed (provisionally) for DCH (step 370). Selecting the smallest available time slot number in a system where DCH channels are allocated first in the frame (lower time slot numbers) and USCH channels are allocated last in the frame (higher time slot numbers) will allow the DCH channels to be grouped together. It will be appreciated that in systems having different configurations, other grouping criteria may be used.

This policy of grouping DCH time slots, when applied across the one or many RNCs, aims to place the DCH slots before the USCH slots in all cells as far as possible. This makes interference measurements used by DCA1 more reliable since DCH slots with approximately constant bandwidth are aligned across cells. Tests (2) and (3) (steps 380 and 390) are then performed with this newly released slot (test (1) is not required since there is no DCH resource in the new slot). If either test fails the CAC is deemed to have failed and the provisionally acquired timeslot is returned to USCH usage.

Although the tests (1) to (3) in the flow chart of FIG. 3 are described below in terms of 3GPP TDD, it will be understood that these tests are generally applicable to other TDD systems. The tests are as follows:

Test (1) Availability of Code Division Multiple Access code: Check uplink code resource in the timeslot (the RNC must ensure that there is a spare CDMA code(s) for use by the UE in the uplink). Typically up to 100% of the code space can be used, for example, 8 codes at SF8, but this ceiling may be reduced by the OAM.

Test (2) Availability of user equipment transmit power: Calculate the expected transmit power of the UE i to the prospective serving cell j in accordance with the following formula:

$$p_{ij} = \frac{SIR_{tgt,i}(ISCP_{j,t} + N_{th,j})}{g_{ij}}$$

where
$SIR_{tgt,i}$ is the SIR target for the service of UE
$ISCP_{j,t}$ is the ISCP measured by the Node B j in timeslot t,
$g_{ij}$ is the pathgain from UE i to cell i, and
$N_{th,j}$ is the thermal noise power at Node B j.

This is an approximation: it is assumed that the intracell interference is zero, that the SIR will match the target, and that the intercell interference will not increase following the admission. Note, the thermal noise power may be measured at the Node B (and passed to the RNC via OAM), or the worst case value within the specification may be assumed.

$p_{ij}$ is compared with the maximum transmit power of the UE.

Test (3) Acceptability of resulting interference level: Check on whether the intercell interference levels at the cell sites will be acceptable after the admission: relative load calculation. In the publication "Uplink admission control in WCDMA based on relative load estimates" referred to above, the relative load calculation includes intracell and intercell interference. In this aspect of the preferred embodiment of the present invention, the relative load calculation accounts for the fact that there is no intracell interference at the Node B after the Node B has detected the TDD signal (see equation below). The difference is incorporated by restricting the set of terms included in the summation.

Inputs to the test are:
path gain measurements from each admitted mobile transmitting in timeslot t to all neighbour cells (the UE will only take measurements on the strongest neighbours, path gains to other cells will be assumed to be zero)
path gain measurements from candidate mobile i to all neighbour cells (the UE will only take measurements on the strongest neighbours, this is set $N_i$)
calculation of the existing relative load on each cell n, in timeslot t, $\hat{L}_{n,t}$ as $$\hat{L}_{n,t} = \sum_{m=1, m \notin S_n}^{M_t} \frac{SIR_{tgt,m} g_{mn}}{g_{mk}}$$

where
m is the mobile number, ranging from 1 to Mt, in the system transmitting in timeslot t,
$S_n$ is the subset of the Mt mobiles that are served by cell n, SIR$_{tgt,m}$ is the signal to interference ratio target for mobile m,
g$_{mn}$ is the path gain from mobile m to cell n, and
g$_{mk}$ is the path gain from mobile m to its serving site, cell k.
The algorithm used is as follows:
Calculate the new relative load for all cells for which path gain measurements are available from UE i (but excluding cell j, the prospective serving cell for UE i), $\forall n \in N_i$, in accordance with the following formula $$\hat{L}_{n,t\,NEW} = \hat{L}_{n,t\,OLD} + \frac{SIR_{tgt,i}g_{in}}{g_{ij}}$$

Admit the user if $\hat{L}_{n,t,NEW} \leq L_{max}$, $\forall n \in N_i$.
L$_{max}$ is typically a parameter that may be set at the OAM.
The typical range of values for L$_{max}$ is $0 \leq L_{max} \leq 1$.

Downlink CAC

Figure 4:
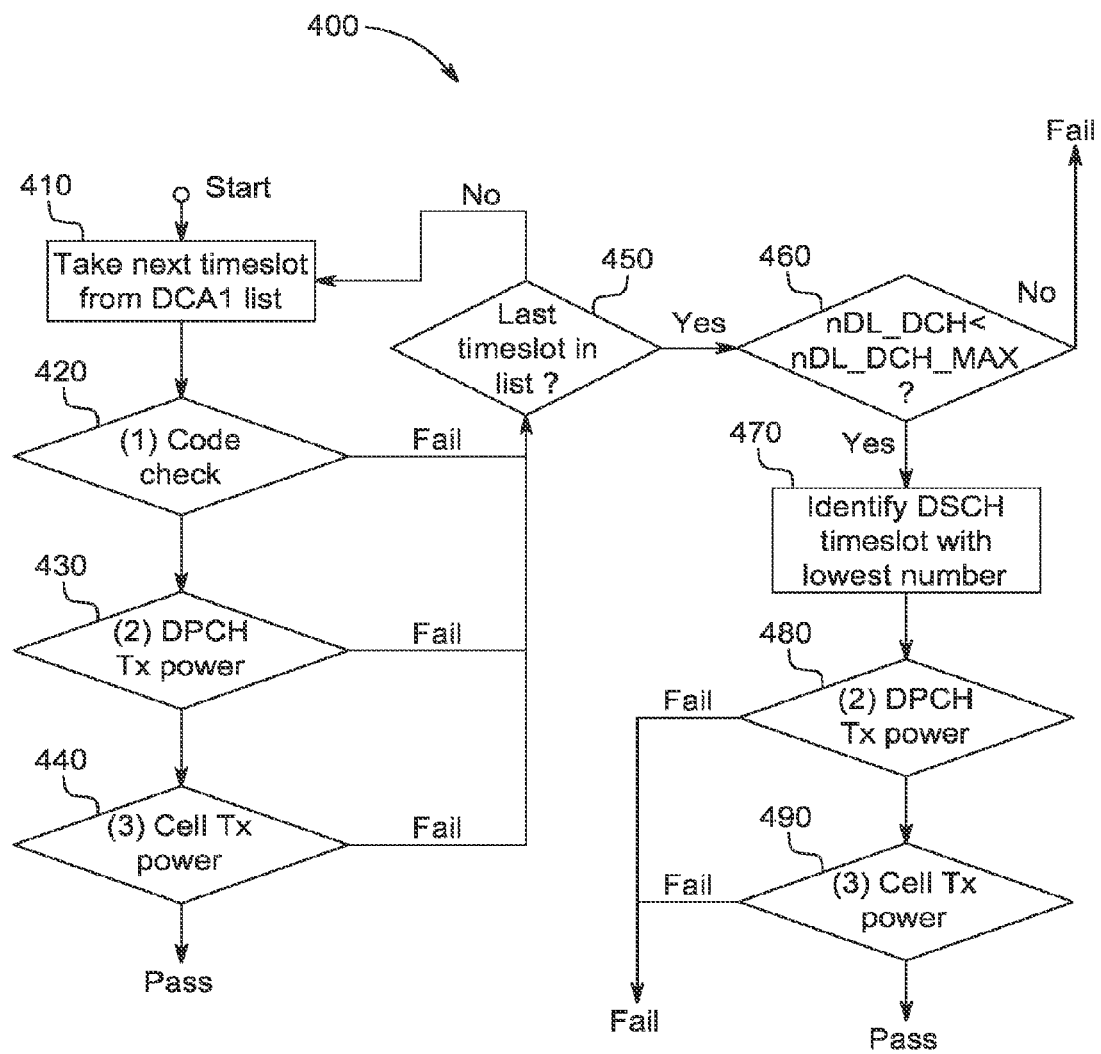
FIG. 4 shows a block schematic diagram illustrating downlink CAC flow in the system of FIG. 1, incorporating the present invention.

The flow chart 400 in FIG. 4 shows the sequence of steps of downlink CAC in accordance with the preferred embodiment of the present invention. It may be noted that this flow chart 400 shown in FIG. 4 for downlink CAC flow is similar to the flow chart 300 for uplink flow shown in FIG. 3 and described above. The flow chart of FIG. 4 is described in terms of 3GPP terminology where a DCH is a dedicated channel and a DSCH is a downlink shared channel.

After start, each timeslot is taken (steps 410 and 450) in turn from the DCA1 list and tests (1) to (3)—steps 420 to 440—(described below) are applied to the timeslots until a timeslot is found for which all tests are passed. If all timeslots fail a new timeslot is provisionally acquired for DL DCH if the maximum number of DL DCH slots (n$_{DL\_DCH\_MAX}$) has not been reached (step 460). In an aspect of the preferred embodiment of the invention, in such circumstances, the DSCH slot with the smallest timeslot number is sacrificed (provisionally) for DCH (step 470). This policy, when applied across the one or many RNCs, aims to place the DCH slots before the DSCH slots in all cells as far as possible. This aims to align DCH usage between cells for the reasons discussed above for uplink CAC (FIG. 3). Tests (2) and (3) (steps 480 and 490) are then performed with this newly released slot (test (1) is not required since there is no DCH resource in the new slot). If either test fails the CAC is deemed to have failed and the provisionally acquired timeslot is returned to DSCH usage.

Figure 5:
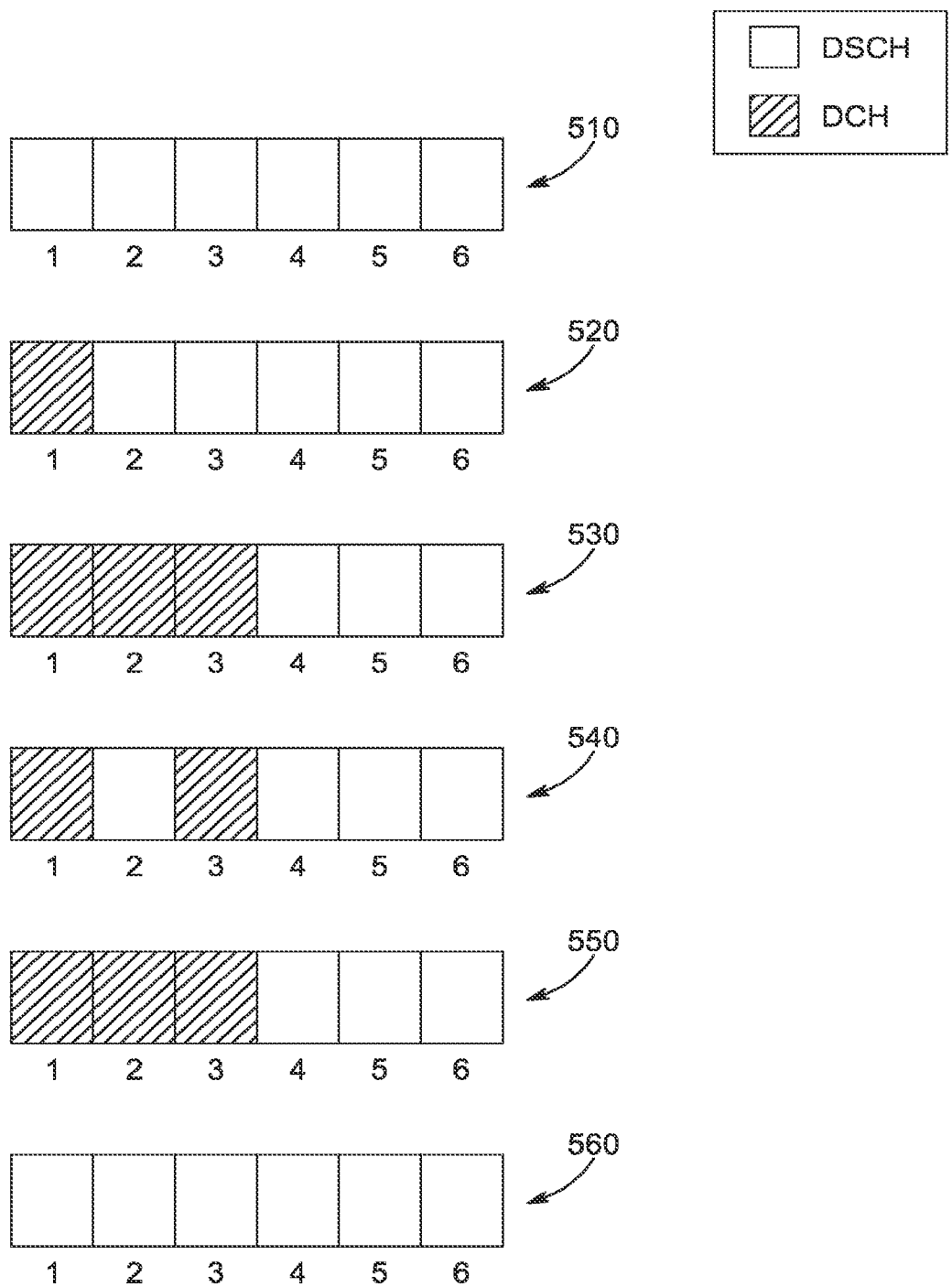
FIG. 5 shows a block schematic diagram illustrating slot allocation to DCH and DSCH in the system of FIG. 1, incorporating the present invention.

FIG. 5 illustrates slot allocation to DCH and DSCH in accordance with this feature of the described embodiment of the present invention, and demonstrates how the DCH slots are held to the lower slot numbers. As can be seen:
- initially, at stage 510, all timeslots (1 to 6) are allocated for DSCH
- next, at stage 520, DCH users are admitted in timeslot 1
- next, at stage 530, more DCH users are admitted, requiring exploitation of timeslots 2 and 3
- next, at stage 540, all DCH users in timeslot 2 end their calls, returning this timeslot to DSCH next, at stage 550, more DCH users are admitted; if they will not fit into timeslot 1 and/or timeslot 3, timeslot 2 is reclaimed for DCH
- finally, at stage 560, when all users have ended their calls, timeslots 1 to 3 are returned to DSCH; all timeslots 1 to 6 are then, as at stage 510, allocated to for DSCH The tests in the flow chart of FIG. 4 are described below in terms of 3GPP TDD, though these tests are generally applicable to other TDD systems. Note, these tests are not novel but are included for completeness.

Test (1) Availability of Code Division Multiple Access code: Check downlink code resource in the timeslot (the RNC must ensure that there is a spare CDMA code(s) for use by the UE in the downlink). Typically up to 100% of the code space can be used, for example, 16 codes at SF16, but this ceiling may be reduced by the OAM.

Test (2) Availability of base station transmit power: Check that the DPCH transmit power does not exceed the maximum value set. Calculate the expected transmit power to the UE i from cell j in the timeslot in accordance with the following formula:

$$P_{ij} = \frac{SIR_{tgt,i} ISCP_{i,t}}{RSCP_{ij}/P_{pccpch,j}}$$

SIR$_{tgt,i}$ is the SIR target for the service of UE
ISCP$_{i,t}$ is the ISCP measured by the UE i in timeslot t,
RSCP$_{ij}$ is the RSCP of the P-CCPCH measured by the UE i to cell j,
P$_{pccpch}$ is the P-CCPCH transmit power of the cell j.

It will be understood by those skilled in the art that the RSCP of the P-CCPCH is a measure of the received power of the broadcast beacon channel (P-CCPCH) and that this is reported by the UE to the RNC as a measurement. Thus the term in the denominator of the above equation relates to the path gain to UE i.

Test (3) Availability of base station transmit power: Check that the Node B can accommodate the additional transmit power in the timeslot:

$$P_{carrier} + P_{ij} < P_{max}$$

where P$_{max}$ is set by the operator in the OAM function and P$_{carrier}$ is determined by a common measurement report passed from the Node B to the RNC.

It will be understood that the present invention is also applicable to high speed DSCH, or HS-DSCH, introduced in Release 5 of 3GPP as a new form of shared channel on the downlink. In principal, the downlink slots may accommodate DCH, DSCH and HS-DSCH channels together. The only impact on the DCA is that the maximum number of DL DCH slots (n$_{DL\_DCH\_MAX}$) must accommodate the needs of HS-DSCHs carrying conversational or streaming traffic (in the same way as discussed above for conversational or streaming traffic on DSCH).

It will be appreciated that the method described above for dynamic channel assignment for TDD radio communication networks with coexisting dedicated and shared channels may be carried out in software running on processors (not shown) in the RNC(s) and/or the UE(s), and that the software may be provided as a computer program element carried on any suitable data carrier (also not shown) such as a magnetic or optical computer disc.

It will be also be appreciated that the method described above for dynamic channel assignment for TDD radio communication networks with coexisting dedicated and shared channels may alternatively be carried out in hardware, for example in the form of an integrated circuit (not shown) such as an FPGA (Field Programmable Gate Array) or ASIC (Application Specific Integrated Circuit).

It will be understood that the scheme for dynamic channel assignment for TDD radio communication networks with coexisting dedicated and shared channels described above tends to provide one or more of the following advantages:
  DCA1 and CAC uplink algorithm metrics account for intercell interference, the most significant interference source in TDD mode systems. This accuracy in the algorithm ultimately leads to greater capacity.

Midcall reallocation according to DCA2 allows coverage and quality of service to a user to be maintained when a user moves from the centre of the cell to the cell edge (e.g., a single timeslot SF8 allocation going to 2 allocated timeslots each with SF16).

Dynamic split between dedicated channel timeslots and shared channel timeslots allows the network to optimise radio resources according to traffic type. This will lead to an overall higher capacity when the network supports both dedicated channels and shared channels.

Alignment of the DCH slots across many cells improves the usefulness of measurements for DCA/CAC.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method performed by a network device, the method comprising:
    receiving, by the network device, information indicating time slots not for use by a downlink shared channel, wherein the time slots not for use by the downlink shared channel are aligned for a plurality of network devices in an area;
    sending, by the network device, information to a user equipment (UE) indicating the time slots not for use by the downlink shared channel;
    allocating, by the network device for a plurality of UEs, resources in shared channel time slots for the downlink shared channel;
    sending, by the network device to the plurality of UEs, downlink shared channel data in a frame in the shared channel time slots;
    sending, by the network device to the plurality of UEs, non-downlink shared channel data in the time slots not for use by the downlink shared channel; and
    wherein at least one of the shared channel time slots is designated to send broadcast channel related information in the frame.

2. The method of claim 1, wherein the time slots are time slots of a time division duplex (TDD) frame.

3. The method of claim 1, wherein the time slots are time slots used for CDMA or TDMA transmissions.

4. The method of claim 1, wherein the time slots have different spreading factors.

5. The method of claim 1, wherein the time slots have different inter-cell interference levels.

6. A network device comprising:
    circuitry configured to receive information indicating time slots not for use by a downlink shared channel, wherein the time slots not for use by the downlink shared channel are aligned for a plurality of network devices in an area;
    circuitry configured to send information to a user equipment (UE) indicating the time slots not for use by the downlink shared channel;
    circuitry configured to allocate, for a plurality of UEs, resources in shared channel time slots for the downlink shared channel;
    the circuitry further configured to send, to the plurality of UEs, downlink shared channel data in a frame in the shared channel time slots;
    the circuitry further configured to send, to the plurality of UEs, non-downlink shared channel data in the time slots not for use by the downlink shared channel; and
    wherein at least one of the shared channel time slots is designated to send broadcast channel related information in the frame.

7. The network device of claim 6, wherein the time slots are time slots of a time division duplex (TDD) frame.

8. The network device of claim 6, wherein the time slots are time slots used for CDMA or TDMA transmissions.

9. The network device of claim 6, wherein the time slots have different spreading factors.

10. The network device of claim 6, wherein the time slots have different inter-cell interference levels.

11. A method performed by a wireless network, the method comprising:
    sending, by a first network device to a second network device, information indicating time slots not for use by a downlink shared channel, wherein the time slots not for use by the downlink shared channel are aligned for a plurality of network devices in an area;

sending, by the second network device, information to a user equipment (UE) indicating the time slots not for use by the downlink shared channel;

allocating, by the second network device for a plurality of UEs, resources in shared channel time slots for the downlink shared channel;

sending, by the second network device to the plurality of UEs, downlink shared channel data in a frame in the shared channel time slots;

sending, by the second network device to the plurality of UEs, non-downlink shared channel data in the time slots not for use by the downlink shared channel; and wherein at least one of the shared channel time slots is designated to send broadcast channel related information in the frame.

12. The method of claim 11, wherein the time slots are time slots of a time division duplex (TDD) frame.

13. The method of claim 11, wherein the time slots are time slots used for CDMA or TDMA transmissions.

14. The method of claim 11, wherein the time slots have different spreading factors.

15. The method of claim 11, wherein the time slots have different inter-cell interference levels.

16. A wireless network comprising:
a first network device comprising:
circuitry configured to send information to a second network device indicating time slots not for use by a downlink shared channel, wherein the time slots not for use by the downlink shared channel are aligned for a plurality of network devices in an area;

the second network device comprising:
circuitry configured to send information to a user equipment (UE) indicating the time slots not for use by the downlink shared channel;

circuitry configured to allocate, for a plurality of UEs, resources in shared channel time slots for the downlink shared channel;

the circuitry further configured to send, to the plurality of UEs, downlink shared channel data in a frame in the shared channel time slots;

the circuitry further configured to send, to the plurality of UEs, non-downlink shared channel data in the time slots not for use by the downlink shared channel; and wherein at least one of the shared channel time slots is designated to send broadcast channel related information in the frame.

17. The wireless network of claim 16, wherein the time slots are time slots of a time division duplex (TDD) frame.

18. The wireless network of claim 16, wherein the time slots are time slots used for CDMA or TDMA transmissions.

19. The wireless network of claim 16, wherein the time slots have different spreading factors.

20. The wireless network of claim 16, wherein the time slots have different inter-cell interference levels.

* * * * *